US011093783B2

(12) United States Patent
Oko

(10) Patent No.: US 11,093,783 B2
(45) Date of Patent: Aug. 17, 2021

(54) VEHICLE DETECTION APPARATUS

(71) Applicant: SUBARU CORPORATION, Tokyo (JP)

(72) Inventor: Akitaka Oko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 62 days.

(21) Appl. No.: 16/592,207

(22) Filed: Oct. 3, 2019

(65) Prior Publication Data
US 2020/0184250 A1 Jun. 11, 2020

(30) Foreign Application Priority Data

Dec. 5, 2018 (JP) .............................. JP2018-228083
Sep. 3, 2019 (JP) .............................. JP2019-160291

(51) Int. Cl.
G06K 9/44 (2006.01)
G06K 9/32 (2006.01)
(Continued)

(52) U.S. Cl.
CPC ........... G06K 9/44 (2013.01); G06K 9/00791 (2013.01); G06K 9/3233 (2013.01);
(Continued)

(58) Field of Classification Search
CPC .............. G06K 9/00791; G06K 9/4642; G06K 9/4652; G06K 9/44; G06K 9/6269;
(Continued)

(56) References Cited

U.S. PATENT DOCUMENTS 7,313,869 B1 * 1/2008 Rogers ............... G01B 11/2755
33/203.18
2003/0169906 A1 * 9/2003 Gokturk ............. G06K 9/00362
382/115
(Continued)

FOREIGN PATENT DOCUMENTS

JP 2003-309844 A 10/2003
JP 2007-134961 A 5/2007
(Continued)

OTHER PUBLICATIONS

Vinoharan, Veerapathirapillai, Amirthalingam Ramanan, and Saluka R. Kodituwakku. "A wheel-based side-view car detection using snake algorithm." 2012 IEEE 6th International Conference on Information and Automation for Sustainability. IEEE, 2012. (Year: 2012).*

(Continued)

Primary Examiner — Pinalben Patel
(74) Attorney, Agent, or Firm — McDermott Will & Emery LLP

(57) ABSTRACT

A vehicle detection apparatus includes circuitry configured to cut out a region of interest in an image, calculate a composite feature quantity of the region of interest as a whole by dividing the region of interest into a plurality of divided regions, calculating a feature quantity of each of the divided regions, and combining the calculated feature quantities of the respective divided regions together, and perform, on the basis of the calculated composite feature quantity, filtering that discards the region of interest that is determinable as not being a wheel of a vehicle.

5 Claims, 21 Drawing Sheets

(51) Int. Cl.
    *G06K 9/46* (2006.01)
    *G06K 9/00* (2006.01)
    *G06T 7/73* (2017.01)
(52) U.S. Cl.
    CPC ......... *G06K 9/4642* (2013.01); *G06K 9/4652* (2013.01); *G06T 7/73* (2017.01); *G06T 2207/20021* (2013.01); *G06T 2207/30252* (2013.01)
(58) Field of Classification Search
    CPC ............... G06K 9/3233; G06T 7/73; G06T 2207/30252; G06T 2207/20021; G06T 2207/30261
    See application file for complete search history.

(56) References Cited

U.S. PATENT DOCUMENTS

| | | | | |
|---|---|---|---|---|
| 2010/0092079 A1* | 4/2010 | Aller | ...................... | B42D 15/00 382/165 |
| 2016/0224864 A1* | 8/2016 | Chang | .................. | G06K 9/4604 |
| 2017/0076161 A1 | 3/2017 | Nomura | | |
| 2021/0056291 A1* | 2/2021 | Doublet | ............. | G06K 9/00288 |

FOREIGN PATENT DOCUMENTS

| | | |
|---|---|---|
| JP | 2007-140938 A | 6/2007 |
| JP | 2013-232080 A | 11/2013 |
| JP | 2016-038678 A | 3/2016 |
| JP | 2017-054386 A | 3/2017 |

OTHER PUBLICATIONS

C. Huang et al., "Wheelchair Detection Using Cascaded Decision Tree", IEEE Transactions on Information Technology in Biomedicine, IEEE, Dec. 15, 2009, vol. 14, No. 2, Mar. 2010, pp. 292-300.
Japanese Notice of Reasons for Refusal issued in corresponding Japanese Patent Application No. 2019-160291, dated Nov. 10, 2020. with English translation.

* cited by examiner

US 11,093,783 B2

VEHICLE DETECTION APPARATUS

CROSS-REFERENCE TO RELATED APPLICATIONS

The present application claims priority from Japanese Patent Application No. 2018-228083 filed on Dec. 5, 2018 and Japanese Patent Application No. 2019-160291 filed on Sep. 3, 2019, the entire contents of each of which are hereby incorporated by reference.

BACKGROUND

The technology relates to a vehicle detection apparatus that detects a wheel of a vehicle.

A vehicle detection apparatus has been proposed that determines whether a three-dimensional object in an image is a vehicle. A wheel detection apparatus has also been proposed that detects a wheel of a vehicle. For example, reference is made to Japanese Unexamined Patent Application Publication (JP-A) No. 2007-134961, JP-A No. 2013-232080, and JP-A No. 2017-54386.

SUMMARY

An aspect of the technology provides a vehicle detection apparatus that includes circuitry configured to: cut out a region of interest in an image; calculate a composite feature quantity of the region of interest as a whole by dividing the region of interest into a plurality of divided regions, calculating a feature quantity of each of the divided regions, and combining the calculated feature quantities of the respective divided regions together; and perform, on a basis of the calculated composite feature quantity, filtering that discards the region of interest that is determinable as not being a wheel of a vehicle.

An aspect of the technology provides a vehicle detection apparatus that includes circuitry configured to: cut out a region of interest in an image; calculate an inclination angle, relative to a horizontal direction of the image, of the region of interest; and perform, on a basis of the calculated inclination angle, filtering that discards the region of interest that is determinable as not being a wheel of a vehicle.

An aspect of the technology provides a vehicle detection apparatus that includes circuitry configured to: cut out a region of interest in an image; acquire representative distances of respective outer regions positioned on a left side and a right side of the region of interest; and perform, on a basis of the acquired representative distances of the respective outer regions, filtering that discards the region of interest that is determinable as not being a wheel of a vehicle.

An aspect of the technology provides a vehicle detection apparatus that includes circuitry configured to: cut out a region of interest in an image; and perform, on a basis of color information in the region of interest, filtering that discards the region of interest that is determinable as not being a wheel of a vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
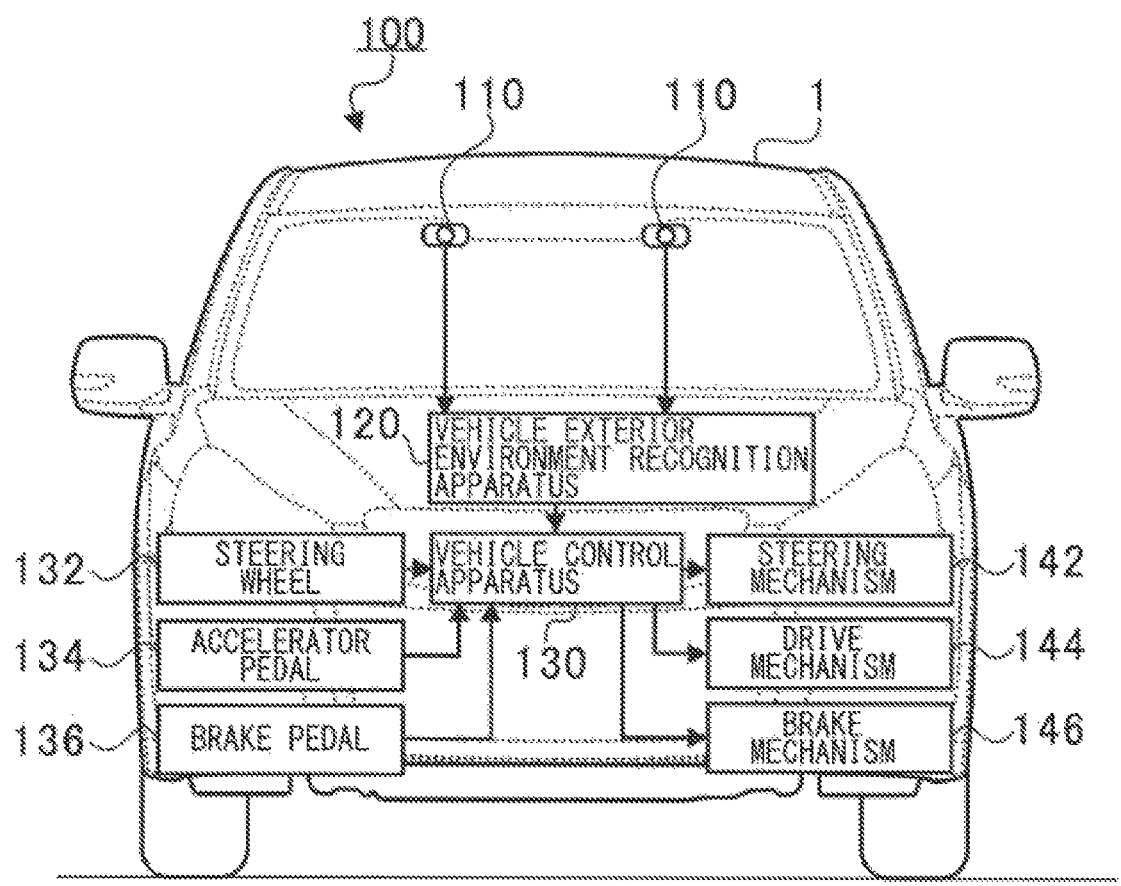
FIG. 1 is a configuration diagram schematically illustrating an example of a configuration of a vehicle exterior environment recognition system that includes a vehicle detection apparatus according to one example embodiment of the disclosure.

In the following, some embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. The description of some embodiments is given in the following order.

1. First Example Embodiment
   1.0 Outline
   1.1 Configuration
   1.2 Operation
   1.3 Example Effects
2. Other Example Embodiments 1. First Example Embodiment

[1.0 Outline]

At least one example embodiment is directed to a technique that detects a vehicle by detecting a wheel.

In recent years, a technique has been developed that captures an image of an environment outside an own vehicle by a camera mounted on the own vehicle and identifies a three-dimensional object, such as a preceding vehicle, on the basis of the captured image. The development of such a technique has progressed popularization of a vehicle having a collision avoidance function that avoids a collision with the identified three-dimensional object, or having an adaptive cruise control (ACC) that keeps a distance between the own vehicle and the preceding vehicle to a predetermined distance.

In addition, many proposals have been made on a technique that determines whether a three-dimensional object in an image is a vehicle, including a vehicle detection algorithm based on machine learning. The vehicle detection algorithm based on the machine learning, however, involves learning costs due to a wide variety of vehicle shapes, and involves calculation costs for a classifier directed to a vehicle detection. Meanwhile, wheels have similar shapes among any vehicles, making it easier to create a detector based on the machine learning and allowing for a lighter calculation amount to be performed by the detector, as compared with a case where the vehicle itself is to be detected.

Upon detecting a wheel, it is desirable that a detection process be performed on the basis of an inclination of the wheel.

Figure 4:
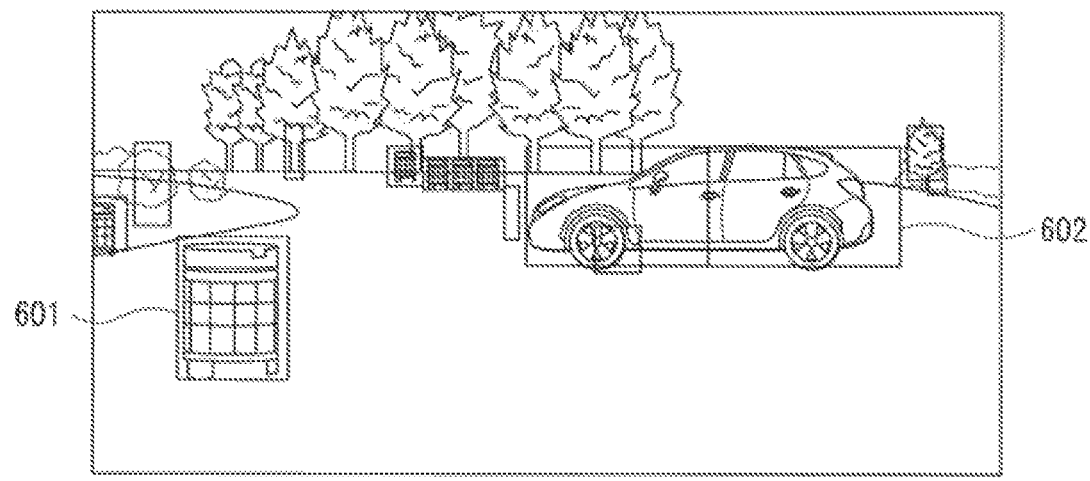
FIG. 4 is an explanatory diagram illustrating an example of an image in which a vehicle and a wheel as detection targets directly face an own vehicle.
Figure 5:
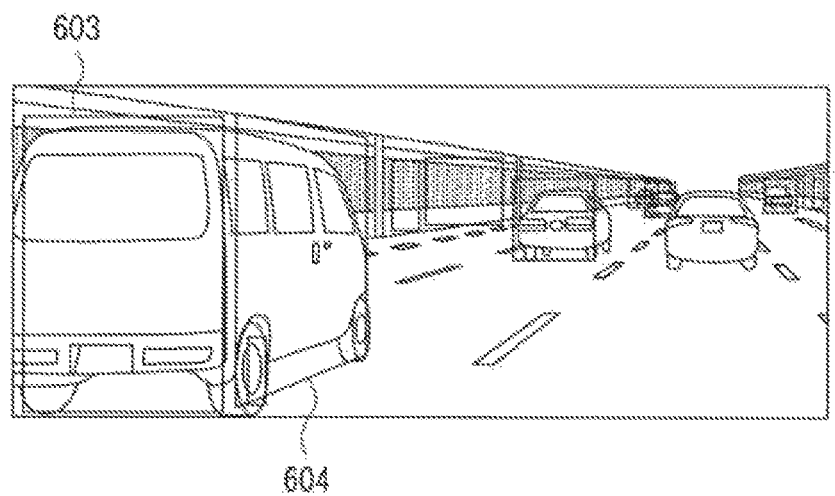
FIG. 5 is an explanatory diagram illustrating an example of an image in which the vehicle and the wheel as the detection targets are inclined in an oblique direction relative to the own vehicle.

FIG. 4 illustrates an example of an image in which a vehicle and a wheel as detection targets directly face an own vehicle. FIG. 5 illustrates an example of an image in which the vehicle and the wheel as the detection targets are inclined in an oblique direction relative to the own vehicle. In FIGS. 4 and 5, each region surrounded by a quadrangle, such as a region 601, a region 602, a region 603, or a region 604, has been identified as a three-dimensional object.

It is to be noted that an inclination occurs in an image portion that indicates a wheel and a difference occurs in a shape of the wheel in an image accordingly, between the vehicle that directly faces the own vehicle, such as the vehicle identified by the region 602 illustrated in FIG. 4, and the vehicle present on a side of the own vehicle, such as the vehicle identified by the region 604 illustrated in FIG. 5. Under such circumstances, optimizing a wheel detection process on the basis of the vehicle that directly faces the own vehicle, such as the vehicle identified by the region 602 illustrated in FIG. 4, can lead to a decrease in detection performance of a wheel of the vehicle present on the side of the own vehicle, such as the vehicle identified by the region 604 illustrated in FIG. 5.

At least one example embodiment provides a technique that makes it possible to detect a wheel of a vehicle efficiently and efficiently detect the vehicle accordingly. At least one example embodiment also provides a technique that makes it possible to perform a detection process of a wheel on the basis of an inclination of the wheel.

[1.1 Configuration]

[Vehicle Exterior Environment Recognition System 100]

FIG. 1 schematically illustrates an example of a configuration of a vehicle exterior environment recognition system 100 that includes a vehicle detection apparatus according to a first example embodiment of the disclosure.

An own vehicle 1 may include the vehicle exterior environment recognition system 100. The vehicle exterior environment recognition system 100 may include two imaging units 110, a vehicle exterior environment recognition apparatus 120, and a vehicle control apparatus 130. The vehicle control apparatus 130 may be an engine control unit (ECU). The own vehicle 1 may also include a steering wheel 132, an accelerator pedal 134, a brake pedal 136, a steering mechanism 142, a drive mechanism 144, and a brake mechanism 146.

The vehicle control apparatus 130 may receive an input of an operation performed by a driver via each of the steering wheel 132, the accelerator pedal 134, and the brake pedal 136. The vehicle control apparatus 130 may transmit data based on the driver's operation input to the steering mechanism 142, the drive mechanism 144, and the brake mechanism 146 and thereby control the own vehicle 1. Further, the vehicle control apparatus 130 may control the steering mechanism 142, the drive mechanism 144, and the brake mechanism 146 in accordance with instructions given from the vehicle exterior environment recognition apparatus 120.

The two imaging units 110 each may include an imaging device such as a charge-coupled device (CCD) or a complementary metal-oxide semiconductor (CMOS). The imaging units 110 each may perform imaging of a vehicle exterior environment ahead of the own vehicle 1, and each may generate a luminance image that contains at least data on luminance. For example, the imaging units 110 each may generate, as the luminance image, a color image expressed by a color value. In one example, the color value may be a group of numerical values related to one luminance (Y) and two color differences (UV). In another example, the color value may be a group of numerical values related to three hues including R (red), G (green), and B (blue).

The imaging units 110 may be so disposed that their respective optical axes become substantially parallel to each other along a traveling direction of the own vehicle 1, and may be so disposed as to be separated away from each other in a substantially horizontal direction, for example. The imaging units 110 each may continuously generate the luminance image for each frame of, for example but not limited to, 1/60 second (at a frame rate of 60 fps). The luminance image may be obtained as a result of the imaging performed on a three-dimensional object present in a detection region ahead of the own vehicle 1. The three-dimensional objects to be recognized by the imaging units 110 may include: a three-dimensional object that is present independently; and an object identifiable as a part of the independently-present three-dimensional object. Non-limiting examples of the independently-present three-dimensional object may include a bicycle, a pedestrian, a vehicle, a traffic light, a road (i.e., a traveling path), a road sign, a guardrail, and a building. Non-limiting examples of the object identifiable as a part of the independently-present three-dimensional object may include a wheel of the bicycle and a wheel of the vehicle.

The vehicle exterior environment recognition apparatus 120 may obtain the luminance image from each of the imaging units 110. By obtaining the luminance images, the vehicle exterior environment recognition apparatus 120 may determine parallax data including a parallax and a screen position with use of so-called pattern matching. The screen position may indicate a position of any block in a screen. The pattern matching may involve searching a block (such as an array of four horizontal pixels by four vertical pixels) corresponding to any block, extracted from one of the luminance images, from the other of the luminance images. The term "horizontal" refers to a lateral direction of a screen of the captured image, and the term "vertical" refers to a vertical direction of the screen of the captured image. For the pattern matching, the luminance (Y) may be compared between a pair of luminance images on an any block basis. Non-limiting examples of such a luminance comparison method may include SAD (Sum of Absolute Difference) that obtains luminance differences, SSD (Sum of Squared intensity Difference) that uses the squared differences, and ZNCC (Zero-mean Normalized Cross Correlation) that obtains similarity of variance obtained as a result of subtraction of an average luminance value from a luminance value of each pixel. The vehicle exterior environment recognition apparatus 120 may perform the foregoing parallax determining process, performed on a block basis, for all of the blocks in the detection region. The detection region may be, for example but not limited to, an array of 600 pixels by 200 pixels. Note that each of the blocks may include the array of four horizontal pixels by four vertical pixels; however, any number of pixels may be set for each of the blocks.

The vehicle exterior environment recognition apparatus 120 may determine the parallax per block, i.e., determine the parallax on a detection resolution basis. However, it is difficult for the vehicle exterior environment recognition apparatus 120 to recognize the block in terms of which part of a three-dimensional object the block belongs and in terms of a type of the three-dimensional object. Accordingly, the parallax data is determined independently on the detection resolution basis (e.g., on the block basis) with respect to the detection region, not on a three-dimensional object basis. Note that an image associated with the thus-determined parallax data is hereinafter referred to as a distance image to distinguish between the luminance image and the distance image.

Further, with use of three-dimensional data, the vehicle exterior environment recognition apparatus 120 may also perform grouping of the blocks, as a target, that are equal to each other in color value and close to each other in the three-dimensional position data. The three-dimensional position data may relate to a three-dimensional position in real space and include a relative distance relative to the own vehicle 1, and may be calculated on the basis of a luminance value (i.e., the color value) based on the luminance image and on the basis of the distance image. By grouping the blocks, the vehicle exterior environment recognition apparatus 120 may identify which specific object does the target in the detection region ahead of the own vehicle 1 correspond to. Non-limiting examples of the specific object may include a preceding vehicle and the bicycle. Identifying the three-dimensional object in this way allows the vehicle exterior environment recognition apparatus 120 to perform a collision avoidance control that avoids a collision with the identified three-dimensional object, or the adaptive cruise control (ACC) that controls the own vehicle 1 to keep a safe distance between the own vehicle and the preceding vehicle. Note that, in one example, the parallax data for each block in the distance image may be converted into the three-dimensional position data with use of a so-called stereo method to determine the relative distance described above. The stereo method is a method that determines, from a parallax of a target, the relative distance of the target relative to the imaging units 110 with use of a triangulation method.

[Vehicle Exterior Environment Recognition Apparatus 120]

Next, a description is given in detail of a configuration of the vehicle exterior environment recognition apparatus 120. In the following, a description is given in detail primarily of parts that perform processes related to a wheel detection serving as one of features according to an example embodiment.

Figure 2:
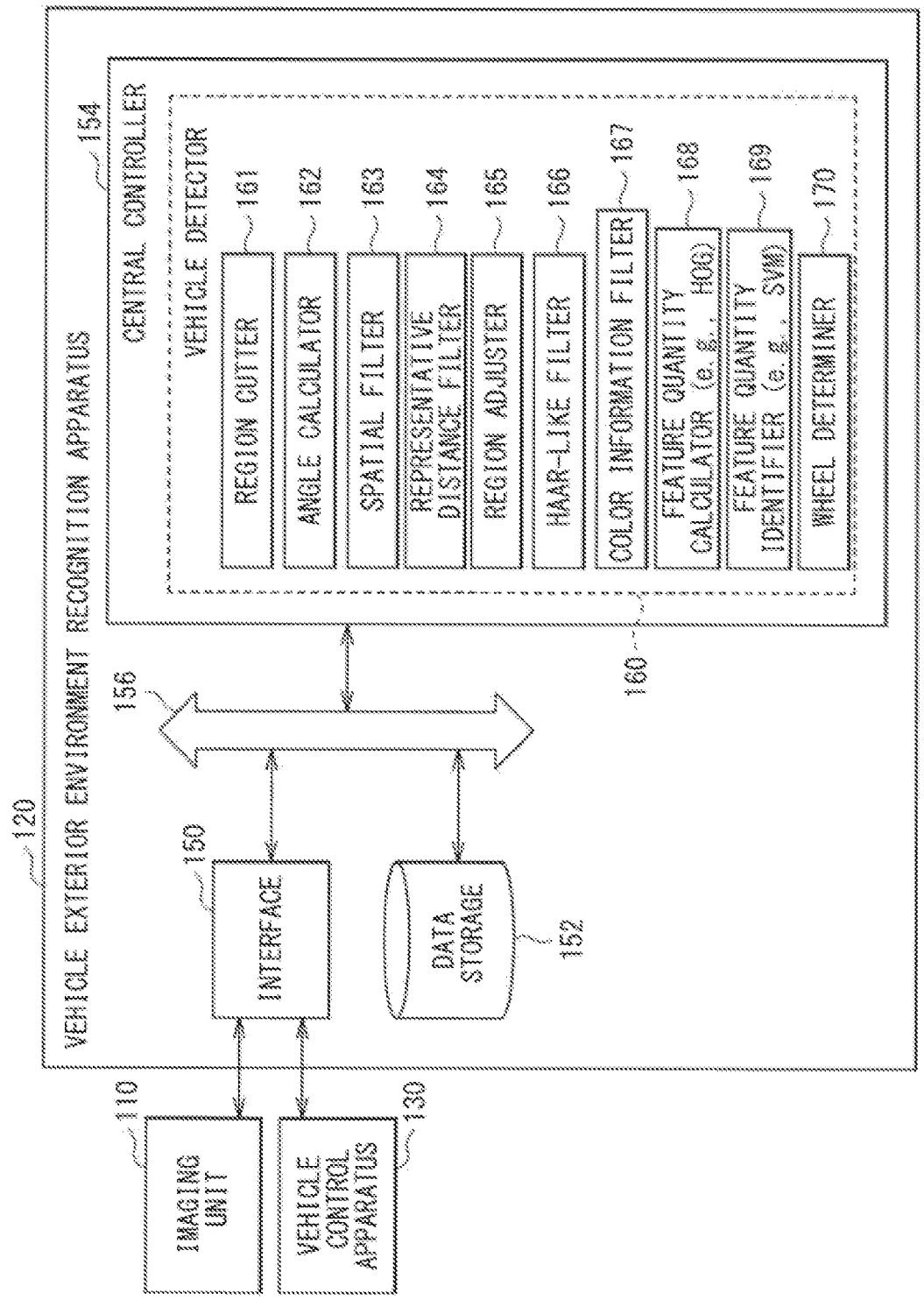
FIG. 2 is a block diagram schematically illustrating an example of a configuration of a vehicle exterior environment recognition apparatus illustrated in FIG. 1.

FIG. 2 schematically illustrates an example of a configuration of the vehicle exterior environment recognition apparatus 120.

Referring to FIG. 2, the vehicle exterior environment recognition apparatus 120 includes a central controller 154. The vehicle exterior environment recognition apparatus 120 may also include an interface (I/F) 150 and a data storage 152.

The interface 150 may allow for a bidirectional exchange of data between the imaging units 110 and the vehicle control apparatus 130. The data storage 152 may be any storage such as a random-access memory (RAM), a flash memory, or a hard disk drive (HDD). The data storage 152 may hold varies pieces of data necessary for executing processes by respective parts provided in the central controller 154 described below.

The central controller 154 may be or may include a semiconductor integrated circuit. For example, the semiconductor integrated circuit may include a central processing unit (CPU), a read-only memory (ROM) that holds programs, etc., and the RAM that serves as a work area. The central controller 154 may control, via a system bus 156, parts including the interface 150 and the data storage 152.

The central controller 154 includes a vehicle detector 160. The central controller 154 may also include a road identifier.

The road identifier may generate a road model on the basis of a known technique, and identify a road region (or a road surface region) in the distance image and in the luminance image.

The vehicle detector 160 may detect a vehicle by performing the wheel detection. The vehicle detector 160 includes a region cutter 161, a feature quantity calculator 168, and a feature quantity identifier 169. The vehicle detector 160 may also include an angle calculator 162, a spatial filter 163, a representative distance filter 164, a region adjuster 165, a Haar-like filter 166, a color information filter 167, and a wheel determiner 170.

In one embodiment, the vehicle detector 160 may serve as a "vehicle detection apparatus". In one embodiment, one or more of the spatial filter 163, the representative distance filter 164, the Haar-like filter 166, the color information filter 167, the feature quantity calculator 168, and the feature quantity identifier 169 may serve as a "filter".

The region cutter 161 performs a region cutting-out process. Specifically, the region cutter 161 cuts out a region of interest (ROI) in an image such as the luminance image. Upon performing the region cutting-out process, the region cutter 161 may refer to the position data calculated on the basis of the distance image. The position data may relate to a position defined by the three-dimensional space in the real space, and include the relative distance relative to the own vehicle 1.

The angle calculator 162 may calculate an inclination angle, in the three-dimensional space, relative to a horizontal direction of the region of interest cut out by the region cutter 161. Upon calculating the inclination angle, the angle calculator 162 may refer to the position data in the three-dimensional space.

The spatial filter 163 may perform filtering of the region of interest, on the basis of values of a size, a distance, and a lateral position of the region of interest in the real space. Upon performing the filtering, the spatial filter 163 may refer to the position data in the three-dimensional space. The spatial filter 163 may also perform filtering of the region of interest, on the basis of a value of a size of the region of interest in the luminance image.

The representative distance filter 164 may acquire values of respective representative distances of outer regions positioned on a left side and a right side of the region of interest, and may perform filtering of the region of interest on the basis of the acquired values of the respective representative distances of the outer regions. Upon acquiring the values of the respective representative distances of the outer regions, the representative distance filter 164 may refer to the position data in the three-dimensional space.

The region adjuster 165 may adjust the region of interest in the luminance image to be in the form of a rectangular region. Upon adjusting the region of interest, the region adjuster 165 may refer to the position data in the three-dimensional space.

The Haar-like filter 166 may perform filtering of the region of interest in the luminance image with use of a Haar-like filter.

The color information filter 167 may perform filtering of the region of interest, on the basis of color information in the region of interest in the luminance image.

The feature quantity calculator 168 divides the region of interest in the luminance image into a plurality of divided regions, and calculates a feature quantity of each of the divided regions. Further, the feature quantity calculator 168 combines or joins the calculated feature quantities of the respective divided regions together to calculate a composite feature quantity of the region of interest as a whole. In some embodiments, the feature quantity calculator 168 may change the order of combining the feature quantities of the respective divided regions, on the basis of the inclination angle calculated by the angle calculator 162. For example, the feature quantity calculator 168 may calculate histograms of oriented gradients (HOG) as the feature quantity.

The feature quantity identifier 169 performs filtering of the region of interest, on the basis of the composite feature quantity calculated by the feature quantity calculator 168. The feature quantity identifier 169 may include a classifier. For example, the classifier may be a support vector machine (SVM).

The wheel determiner 170 may determine that the region of interest, having been subjected to the filtering by the feature quantity identifier 169, includes a wheel of a vehicle.

[1.2 Operation]

Next, a description is given in detail of an operation to be performed by the vehicle detector 160. The vehicle detector 160 performs the processes related to the wheel detection serving as one of features according to an example embodiment.

Figure 3:
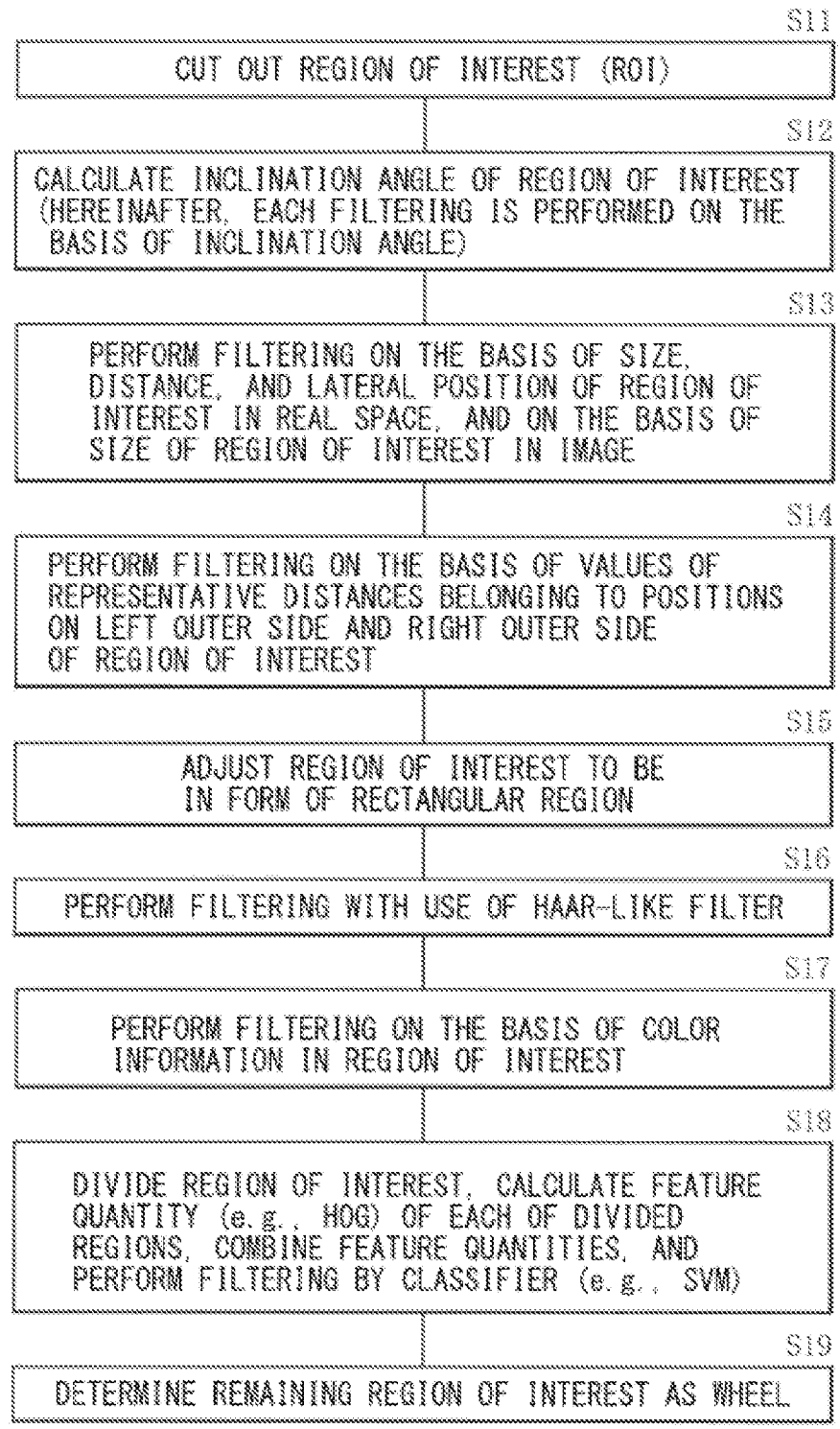
FIG. 3 is a flowchart illustrating an example of a flow of a wheel detection process to be performed by a vehicle detector.

FIG. 3 illustrates an example of a flow of a wheel detection process to be performed by the vehicle detector 160.

First, with the region cutter 161, the vehicle detector 160 may refer to the position data in the three-dimensional space and perform the region cutting-out process that cuts out the region of interest (ROI) (step S11). Thereafter, with the angle calculator 162, the vehicle detector 160 may refer to the position data in the three-dimensional space and calculate the inclination angle, in the three-dimensional space, relative to the horizontal direction of the region of interest cut out by the region cutter 161 (step S12). It is to be noted that, after step S12, the vehicle detector 160 may perform filtering processes on the basis of the inclination angle calculated by the angle calculator 162.

Thereafter, with the spatial filter 163, the vehicle detector 160 may refer to the position data in the three-dimensional space and perform the filtering of the region of interest, on the basis of the values of the size, the distance, and the lateral position of the region of interest in the real space. Further, with the spatial filter 163, the vehicle detector 160 may also perform the filtering of the region of interest, on the basis of the value of the size of the region of interest in the luminance image (step S13).

Thereafter, with the representative distance filter 164, the vehicle detector 160 may refer to the position data in the three-dimensional space and perform the filtering of the region of interest, on the basis of the values of the respective representative distances belonging respectively to positions on the left outer side and the right outer side of the region of interest (step S14). Thereafter, with the region adjuster 165, the vehicle detector 160 may refer to the position data in the three-dimensional space and adjust the region of interest in the luminance image to be in the form of the rectangular region (step S15).

Thereafter, with the Haar-like filter 166, the vehicle detector 160 may perform the filtering of the region of interest in the luminance image with use of the Haar-like filter (step S16). Thereafter, with the color information filter 167, the vehicle detector 160 may perform the filtering of the region of interest, on the basis of the color information in the region of interest in the luminance image (step S17).

Thereafter, with the feature quantity calculator 168, the vehicle detector 160 divides the region of interest in the luminance image into the plurality of divided regions, and calculates the feature quantity of each of the divided regions. Further, with the feature quantity calculator 168, the vehicle detector 160 combines or joins the calculated feature quantities of the respective divided regions together to calculate the composite feature quantity of the region of interest as a whole. Thereafter, with the classifier (e.g., SVM) of the feature quantity identifier 169, the vehicle detector 160 performs the filtering of the region of interest, on the basis of the composite feature quantity (step S18).

Thereafter, with the wheel determiner 170, the vehicle detector 160 may determine the region of interest, remaining after the filtering performed by the feature quantity identifier 169, as a wheel (step S19).

The vehicle detector 160 may determine, as a vehicle, a three-dimensional object that includes the region of interest determined by the wheel determiner 170 as being the wheel.

In the following, a description is given of specific but non-limiting examples of processes performed in the above-described respective steps, according to an example embodiment.

[Process Performed by Region Cutter 161 (Step S11)]

Figure 6:
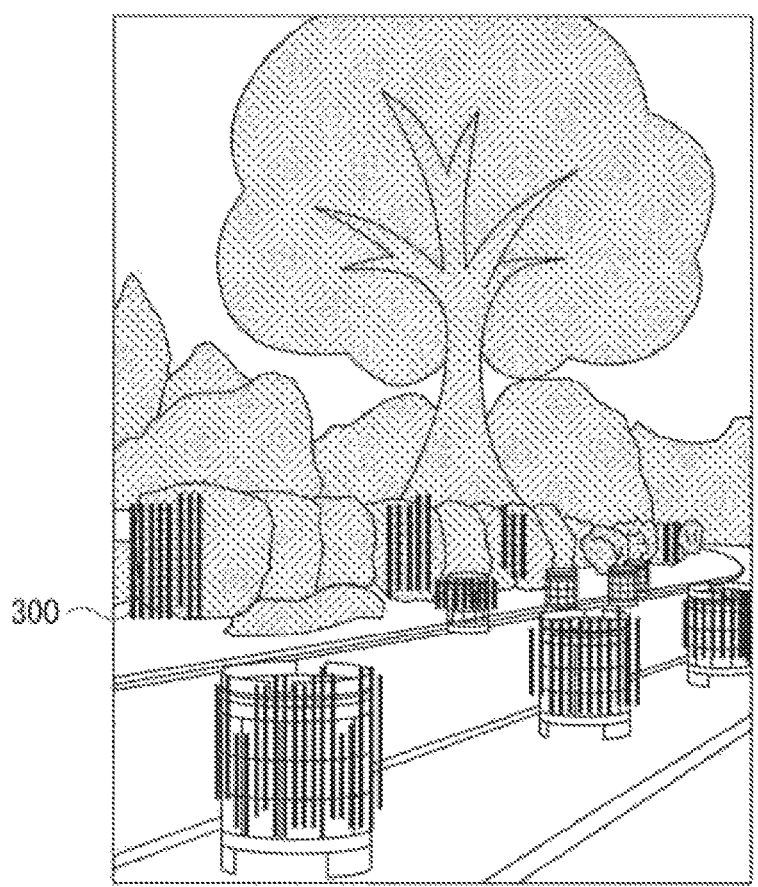
FIG. 6 is an explanatory diagram illustrating an example of representative distances identified from an image.
Figure 7:
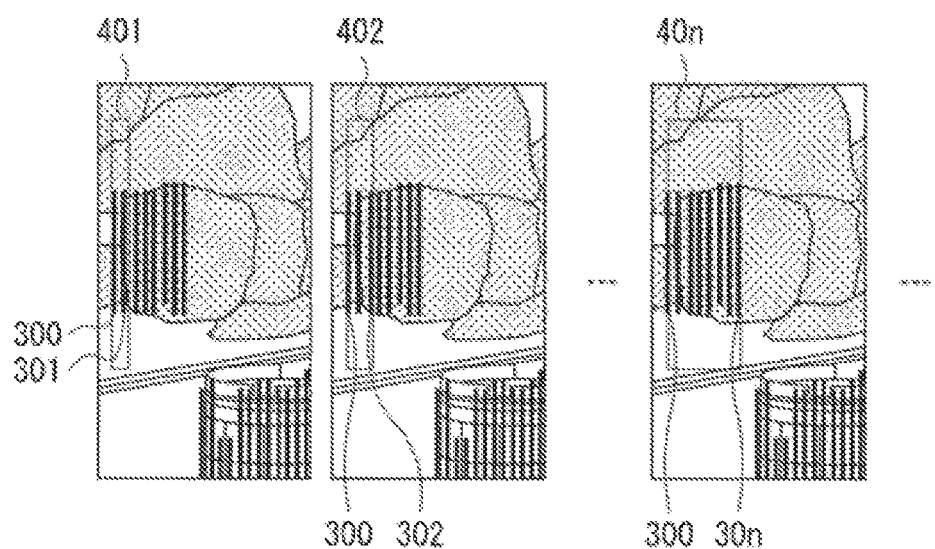
FIG. 7 is an explanatory diagram illustrating an example of regions of interest cut out from the image.

FIG. 6 illustrates an example of representative distances 300, identified by referring to the position data in the three-dimensional space, in the distance image or the luminance image. FIG. 7 illustrates an example of regions of interest 401, 402, . . . , and 40n cut out from the distance image or the luminance image.

The region cutter 161 may first calculate the representative distance for each horizontal position from a left end to a right end of the distance image or the luminance image, for example. In one example, the region cutter 161 may first divide the distance image or the luminance image into a plurality of divided regions in a horizontal direction. The divided regions each may thus have a strip shape. Each of the divided regions may have a width including a predetermined number of pixels in the horizontal direction, and extend in a vertical direction. Thereafter, the region cutter 161 may generate a histogram related to the relative distance for each of the divided regions, on the basis of the position data in the three-dimensional space. For example, the region cutter 161 may generate the histogram for all of the pixel blocks positioned on and above a road surface. On the basis of the thus-generated histogram, the region cutter 161 may identify the relative distance that is most frequent and corresponds to a peak. The wording "corresponds to a peak" refers to a peak value that satisfies any condition, or a value that satisfies any condition near the peak. The region cutter 161 may determine the relative distance that corresponds to the peak as the representative distance of the relevant divided region (i.e., the representative distance per horizontal position). Accordingly, the multiple representative distances 300 may be calculated as denoted by heavy black lines in FIG. 6.

Thereafter, referring to FIG. 7, the region cutter 161 may cut out regions of interest. In one example, the region cutter 161 may cut out the regions of interest by sequentially combining, from the left end to the right end of the distance image or the luminance image, two representative distances corresponding to the respective horizontal positions. For example, the region of interest 401 may be cut out by the region cutter 161 as a result of combining the representative distance 300 and a representative distance 301 that is first adjacent to the representative distance 300 as illustrated in FIG. 7. Further, for example, the region of interest 402 may be cut out by the region cutter 161 as a result of combining the representative distance 300 and a representative distance 302 that is second adjacent to the representative distance 300 as illustrated in FIG. 7. For example, the region of interest 40n may be cut out by the region cutter 161 as a result of combining the representative distance 300 and a representative distance 30n that is "nth" adjacent to the representative distance 300 as illustrated in FIG. 7. In this way, the region cutter 161 may perform the process of cutting out the plurality of regions of interest. Note that the processes to be performed at and after step S12 of FIG. 3 are performed on each of the regions of interest.

[Process Performed by Angle Calculator 162 (Step S12)]

Figure 8:
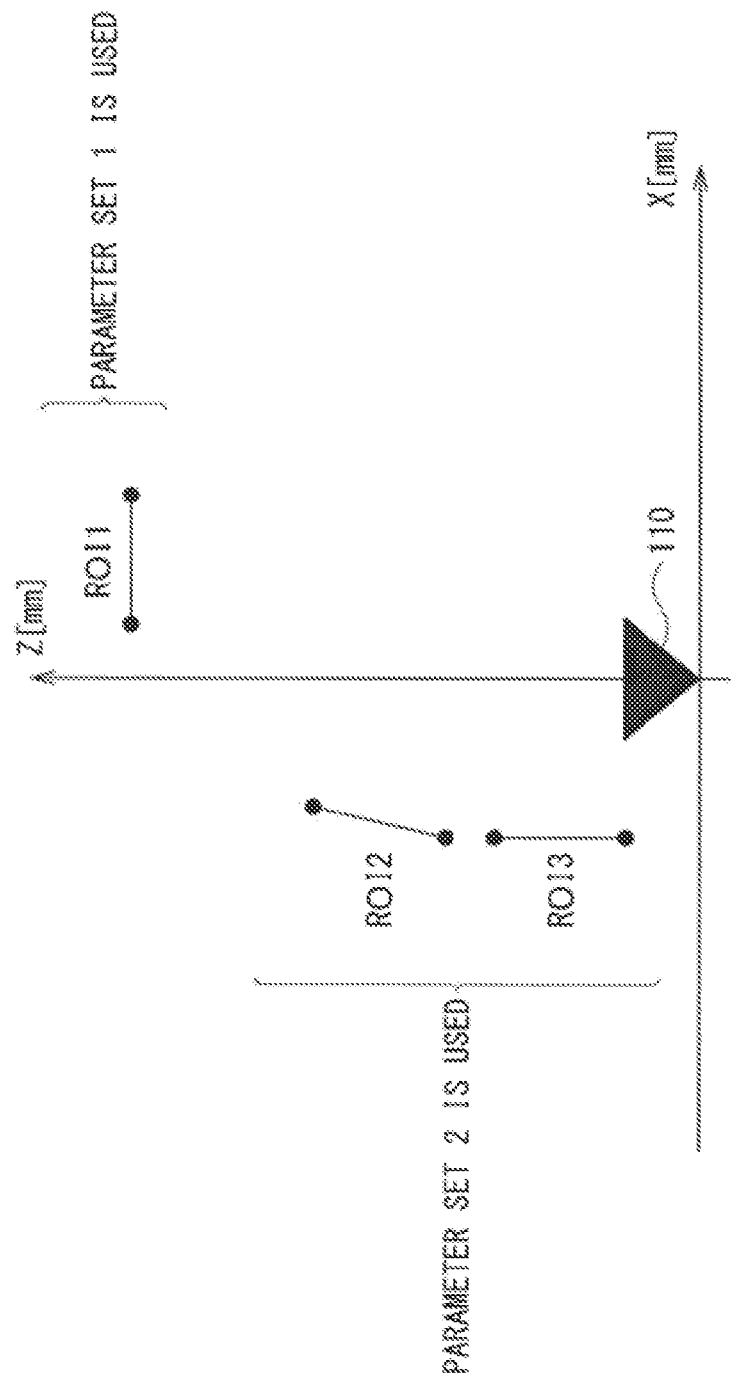
FIG. 8 is an explanatory diagram schematically illustrating an example of a relationship between inclination angles of respective regions of interest and parameters used for filtering processes.

FIG. 8 schematically illustrates an example of a relationship between the inclination angles of the respective regions of interest cut out by the region cutter 161 and parameters used for the filtering processes performed at and after step S13. Note that, in FIG. 8, "Z" denotes a depth direction in the three-dimensional space relative to the imaging units 110, and "X" denotes a horizontal direction in the three-dimensional space. These definitions also apply to any relevant drawing after FIG. 8.

It is to be also noted that the inclination angle of the region of interest may be defined as "a rate of change in distance, in the depth direction, of the region of interest along the horizontal direction in the distance image" in terms of an image. In terms of the real space, the inclination angle of the region of interest may be defined as "a rate of change in distance, from the imaging units 110, of a target, in the real space, that corresponds to the region of interest along the horizontal direction of the vehicle".

The angle calculator 162 may refer to the position data in the three-dimensional space, and calculate the inclination angle, in the three-dimensional space, relative to the horizontal direction of the region of interest cut out by the region cutter 161. For example, in FIG. 8, "ROI1" schematically denotes the region of interest in which the inclination angle, in the three-dimensional space, relative to the horizontal direction is 0 (zero) degree. The inclination angle of zero degree means that the three-dimensional object included in the region of interest directly faces the own vehicle 1, as with the three-dimensional object included in the region 602 illustrated in FIG. 4, for example.

Further, for example, "ROI2" in FIG. 8 schematically denotes the region of interest in which the inclination angle, in the three-dimensional space, relative to the horizontal direction is equal to or greater than 80 degrees but less than 90 degrees. "ROI3" in FIG. 8 schematically denotes the region of interest in which the inclination angle, in the three-dimensional space, relative to the horizontal direction is 90 degrees, for example. The inclination angle of equal to or greater than 80 degrees but less than 90 degrees means that the three-dimensional object included in the region of interest is inclined in the oblique direction relative to the own vehicle 1, as with the three-dimensional object included in the region 604 illustrated in FIG. 4, for example.

How the wheel is seen as the three-dimensional object greatly differs between a case where the wheel directly faces the own vehicle 1 and a case where the wheel is inclined relative to the own vehicle 1. Accordingly, the vehicle detector 160 may perform, at and after step S13, the filtering processes of the region of interest on the basis of the inclination angle. For example, at and after step S13, the vehicle detector 160 may change parameters to be used for the filtering processes on the basis of the inclination angle.

For example, the vehicle detector 160 may perform the filtering processes that use a parameter set 1, in a case where the inclination angle falls within a range from zero degree to 45 degrees. In a case where the inclination angle is equal to or greater than 80 degrees, the vehicle detector 160 may perform the filtering processes that use a parameter set 2 that is different from the parameter set 1, for example. The vehicle detector 160 may discard the region interest in a case where the inclination angle falls in a range that is other than the ranges described above. One reason is that the three-dimensional object identified by the region of interest in this case is determinable as not being the wheel of the vehicle.

[Process Performed by Spatial Filter 163 (Step S13)]

Figure 9:
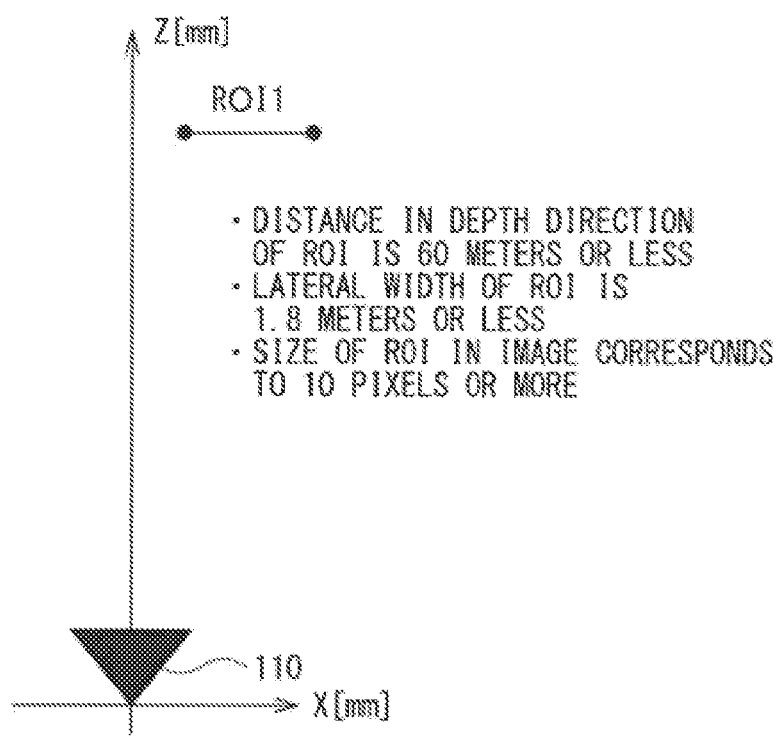
FIG. 9 is an explanatory diagram schematically illustrating an example of filtering to be performed by a spatial filter where an inclination angle of a region of interest is within a predetermined range.

FIG. 9 schematically illustrates an example of filtering to be performed by the spatial filter 163 where the inclination angle of the region of interest is within a predetermined range. In one example, the predetermined range may be from zero degree to 45 degrees.

In an example case where the inclination angle of the region of interest falls within the region from zero degree to 45 degrees, the spatial filter 163 may discard the region of interest if any of the following conditions is not satisfied.

A distance in the depth direction of the region of interest in the real space is 60 meters or less.

A lateral width of the region of interest in the real space is 1.8 meters or less.

A size of the region of interest in the luminance image corresponds to 10 pixels or more.

One reason is that the three-dimensional object identified by the region of interest is determinable as not being the wheel of the vehicle if any of the above conditions is not satisfied.

Figure 10:
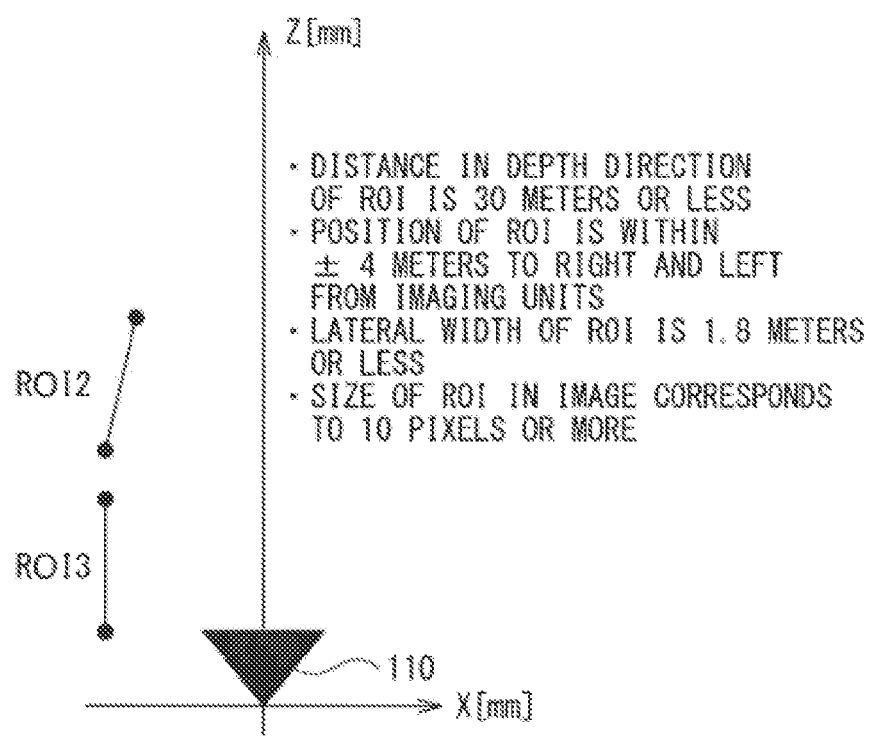
FIG. 10 is an explanatory diagram schematically illustrating an example of filtering to be performed by the spatial filter where the inclination angle of the region of interest is equal to or greater than a predetermined threshold.

FIG. 10 schematically illustrates an example of filtering to be performed by the spatial filter 163 where the inclination angle of the region of interest is equal to or greater than a predetermined threshold. In one example, the predetermined threshold may be 80 degrees.

In an example case where the inclination angle of the region of interest is equal to or greater than 80 degrees, the spatial filter 163 may discard the region of interest if any of the following conditions is not satisfied.

A distance in the depth direction of the region of interest in the real space is 30 meters or less.

A position of the region of interest in the real space is within ±4 meters to the right and the left from the imaging units 110.

A lateral width of the region of interest in the real space is 1.8 meters or less.

A size of the region of interest in the luminance image corresponds to 10 pixels or more.

One reason is that the three-dimensional object identified by the region of interest is determinable as not being the wheel of the vehicle if any of the above conditions is not satisfied.

[Process Performed by Representative Distance Filter 164 (Step S14)]

Figure 11:
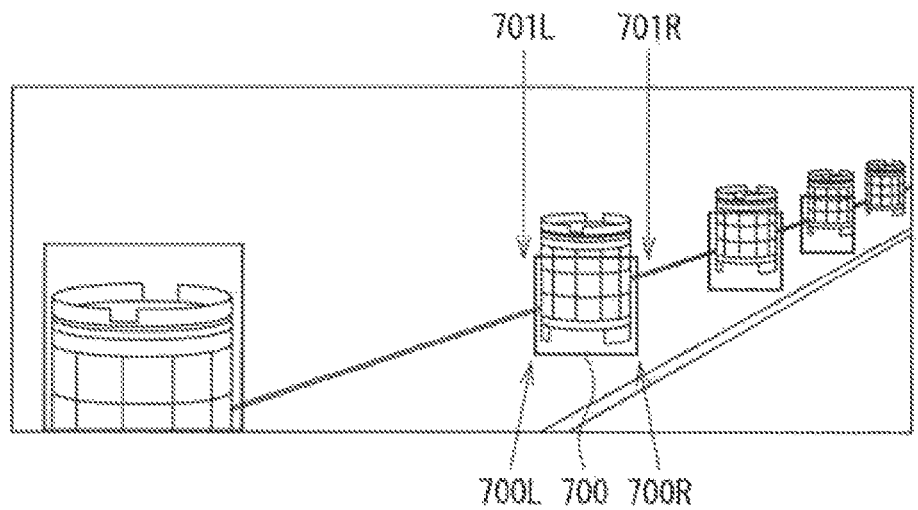
FIG. 11 is an explanatory diagram schematically illustrating an example of filtering to be performed by a representative distance filter.
Figure 12:
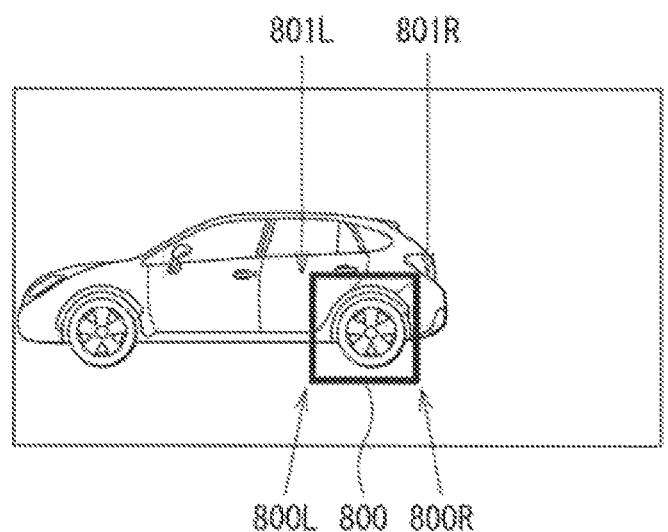
FIG. 12 is an explanatory diagram schematically illustrating an example of filtering to be performed by the representative distance filter.

FIGS. 11 and 12 each schematically illustrate an example of filtering to be performed by the representative distance filter 164. FIG. 11 illustrates an example of a region of interest 700 where the three-dimensional object is not the wheel of the vehicle. FIG. 12 illustrates an example of a region of interest 800 where the three-dimensional object is the wheel of the vehicle. In FIG. 11, 700L, 700R, 701L, and 701R respectively denote a left end of the region of interest 700, a right end of the region of interest 700, a representative distance of the outer region positioned on the left side of the region of interest 700, and a representative distance of the outer region positioned on the right side of the region of interest 700. In FIG. 12, 800L, 800R, 801L, and 801R respectively denote a left end of the region of interest 800, a right end of the region of interest 800, a representative distance of the outer region positioned on the left side of the region of interest 800, and a representative distance of the outer region positioned on the right side of the region of interest 800.

The representative distance filter 164 may refer to the position data in the three-dimensional space, and acquire values of the two respective representative distances of each of the outer regions (see FIGS. 11 and 12) positioned on the left side and the right side of the region of interest. Further, the representative distance filter 164 may determine an average value of the representative distances of each of the outer regions positioned on the left side and the right side of the region of interest. Thereafter, the representative distance filter 164 may determine an absolute value of a difference between a depth value of the region of interest and the average value of the representative distances of each of the outer regions positioned on the left side and the right side of the region of interest. The depth value may be an average value of the left end and the right end of the region of interest. The representative distance filter 164 may discard the region of interest in a case where the absolute value of the difference is equal to or greater than a predetermined first threshold, or in a case where the absolute value of the difference is less than a predetermined second threshold. One reason is that the three-dimensional object identified by the region of interest is determinable as not being the wheel of the vehicle if the absolute value of the difference is equal to or greater than the predetermined first threshold or less than the predetermined second threshold. The representative distance filter 164 may change or switch the thresholds used for making the above determination on the basis of the inclination angle described above.

[Process Performed by Region Adjuster 165 (Step S15)]

Figure 13:
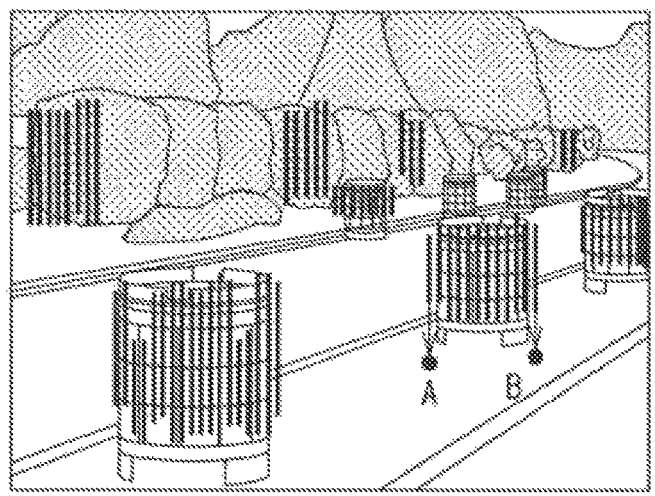
FIG. 13 is an explanatory diagram schematically illustrating an example of a region adjustment process to be performed by a region adjuster.
Figure 14:
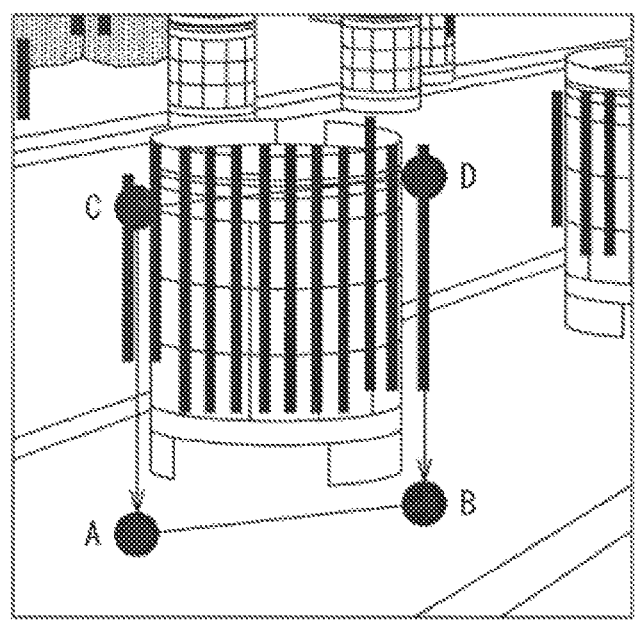
FIG. 14 is an explanatory diagram schematically illustrating an example of the region adjustment process to be performed by the region adjuster.
Figure 15:
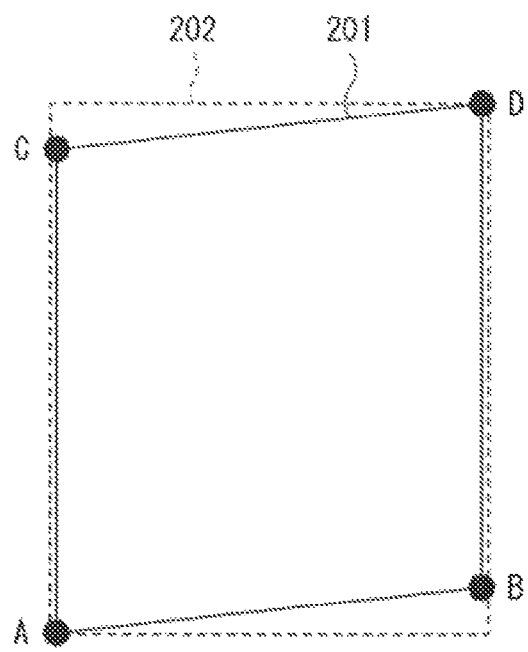
FIG. 15 is an explanatory diagram schematically illustrating an example of the region adjustment process to be performed by the region adjuster.

FIGS. 13 to 15 each schematically illustrate an example of a region adjustment process to be performed on the region of interest by the region adjuster 165.

Referring to FIG. 13, the region adjuster 165 may first determine intersections in the distance image and the luminance image. For example, the region adjuster 165 may determine an intersection between a straight line and a plane that is expressed by the road model. The straight line may be an extension, in a downward direction, of a position of the representative distance at the left end of the region of interest. Further, the region adjuster 165 may determine a position in a vertical direction of the intersection, as denoted by a point A of FIG. 13. Likewise, the region adjuster 165 may determine an intersection between a straight line as an extension, in the downward direction, of a position of the representative distance at the right end of the region of interest and the plane that is expressed by the road model. Further, the region adjuster 165 may determine a position in the vertical direction of the intersection, as denoted by a point B of FIG. 13.

Thereafter, the region adjuster 165 may calculate a distance "d" in millimeter [mm] in the three-dimensional space of each of the points A and B. Further, the region adjuster 165 may determine points C and D in the distance image and the luminance image. The points C and D each may be an extension from corresponding one of the points A and B in a vertical direction by the distance d [mm], as illustrated in FIG. 14. Thus, a parallelogram 201 may be obtained having vertices corresponding to the respective points A, B, C, and D. The region adjuster 165 may determine a rectangular region 202 containing the parallelogram 201 as the region of interest.

[Process Performed by Haar-Like Filter 166 (Step S16)]

Figure 16:
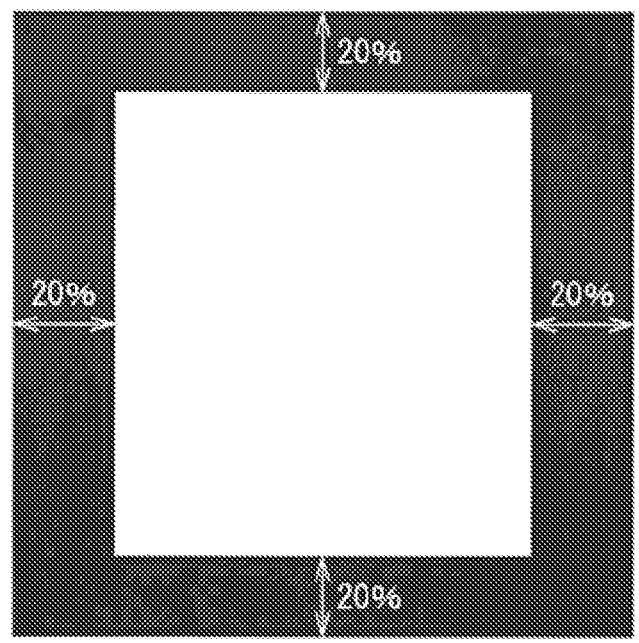
FIG. 16 is an explanatory diagram schematically illustrating an example of filtering to be performed by a Haar-like filter.

FIG. 16 schematically illustrates an example of filtering to be performed by the Haar-like filter 166.

In an example embodiment, the Haar-like filter 166 may apply a Haar-like filter illustrated by way of example in FIG. 16 to the region of interest. In one example, the Haar-like filter 166 may determine a difference in average luminance value between the center and an outer circumference of the region of interest. For example, the outer circumference may be a region extending inwardly from an outermost circumferential position of the region of interest by 20% of the region of interest. The wheel generally has the white center and the black outer circumference. Such a difference in color causes a certain feature to appear. The Haar-like filter 166 may discard the region of interest in a case where a feature different from the feature of the wheel is appeared. One reason is that the three-dimensional object identified by the region of interest is determinable as not being the wheel of the vehicle if the feature different from the feature of the wheel is appeared. For example, the Haar-like filter 166 may change or switch parameters used for the Haar-like filter on the basis of the inclination angle described above. Optionally, the Haar-like filter 166 may vary a rate (%) of the region of the outer circumference on the basis of the inclination angle described above. It is to be noted that a pattern used in an example embodiment illustrated in FIG. 16 is illustrative and non-limiting. An alternative embodiment may use any of various patterns that allow for identification of a wheel of a vehicle.

[Process Performed by Color Information Filter 167 (Step S17)]

A description is given below of an example where the color value of the luminance image is expressed by luminance (Y) information and two pieces of color difference (UV) information.

Figure 17:
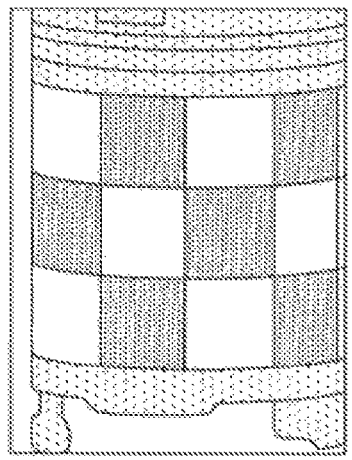
FIG. 17 is an explanatory diagram illustrating an example of a three-dimensional object, other than the wheel, which is cut out from the image.
Figure 18:
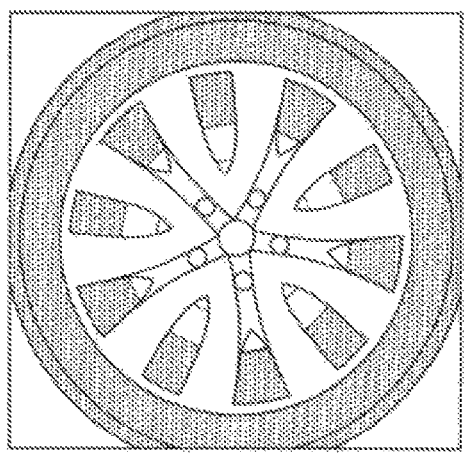
FIG. 18 is an explanatory diagram illustrating an example of the wheel cut out from the image.
Figure 19:
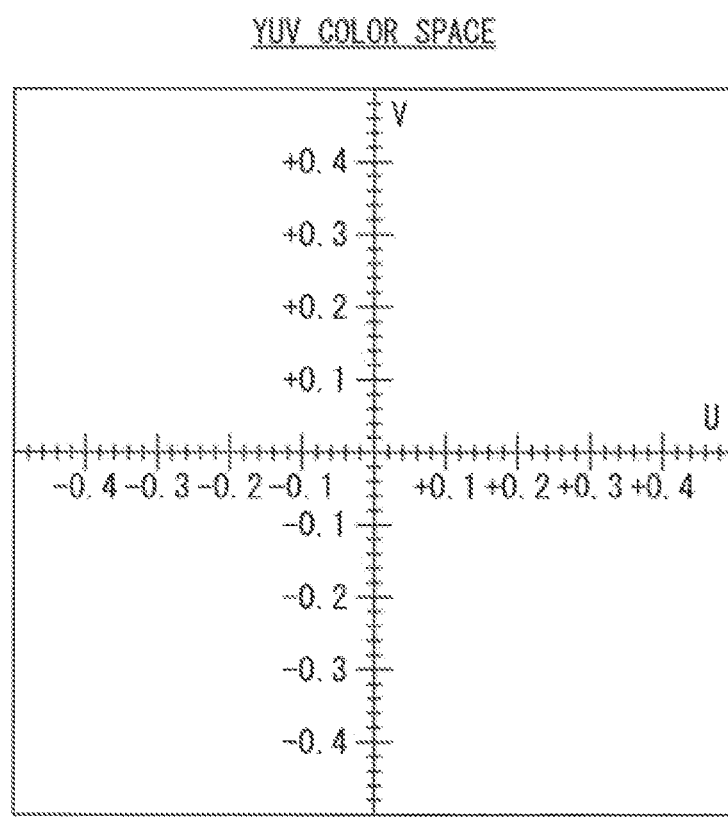
FIG. 19 is an explanatory diagram illustrating an example of a YUV color space.

FIG. 17 illustrates an example of a three-dimensional object, other than the wheel, which is cut out from the luminance image. FIG. 18 illustrates an example of the wheel cut out from the luminance image. FIG. 19 illustrates an example of a YUV color space.

A wheel basically has two colors including white and black, which means that values of U and V are both 0 (zero). Hence, variance of values of U and V in the region of interest is zero. Further, an image as a whole can become orangish under the late afternoon sun. In this case, the values of U and V can be biased to a certain extent, but an amount of variance is zero or very small in such a case. Accordingly, the color information filter 167 may acquire YUV values of pixels in the region of interest, and check the variance of the values of U and V in the region of interest, for example. The color information filter 167 may discard the region of interest in a case where the amount of variance is equal to or greater than a threshold. One reason is that the three-dimensional object identified by the region of interest is determinable as not being the wheel of the vehicle if the amount of variance is equal to or greater than the threshold.

For example, the color information filter 167 may change or switch thresholds used for a filter on the basis of the inclination angle described above.

[Processes Performed by Feature Quantity Calculator 168 and Feature Quantity Identifier 169 (Step S18)]

Figure 20:
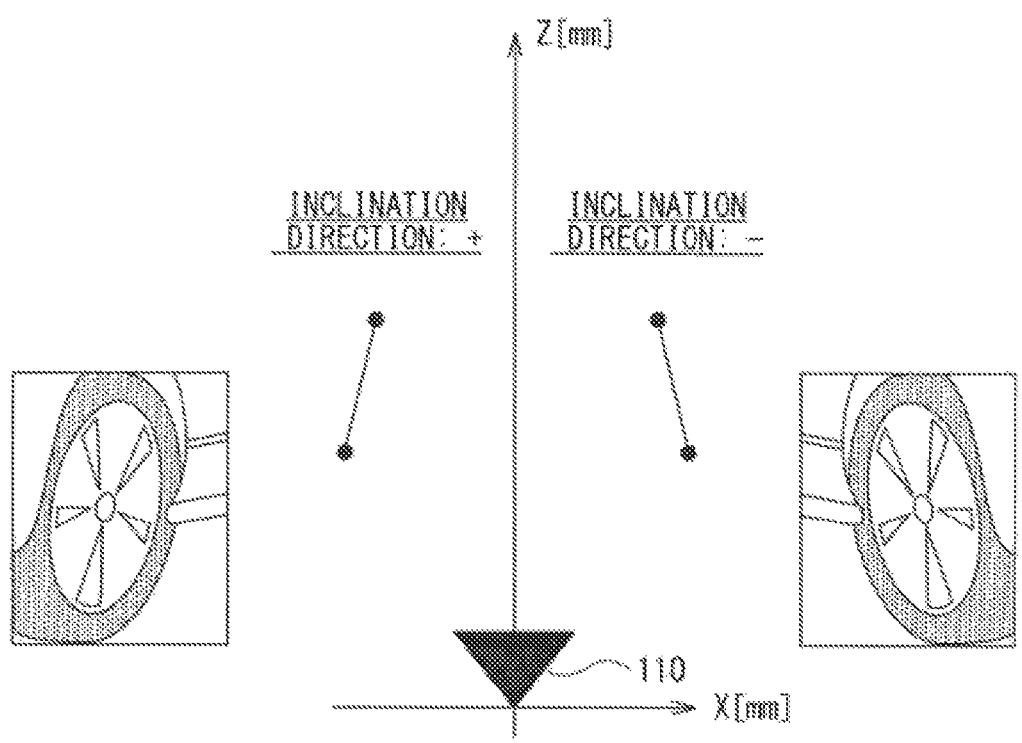
FIG. 20 is an explanatory diagram illustrating an example of inclination directions of respective regions of interest.

FIG. 20 illustrates an example of inclination directions of the respective regions of interest. Referring to FIG. 20, the inclination direction in which the inclination angle is less than 90 degrees relative to the horizontal direction is defined as +(plus), and the inclination direction in which the inclination angle is greater than 90 degrees relative to the horizontal direction is defined as − (minus).

[Inclination Angle of Zero Degree]

Figure 21:
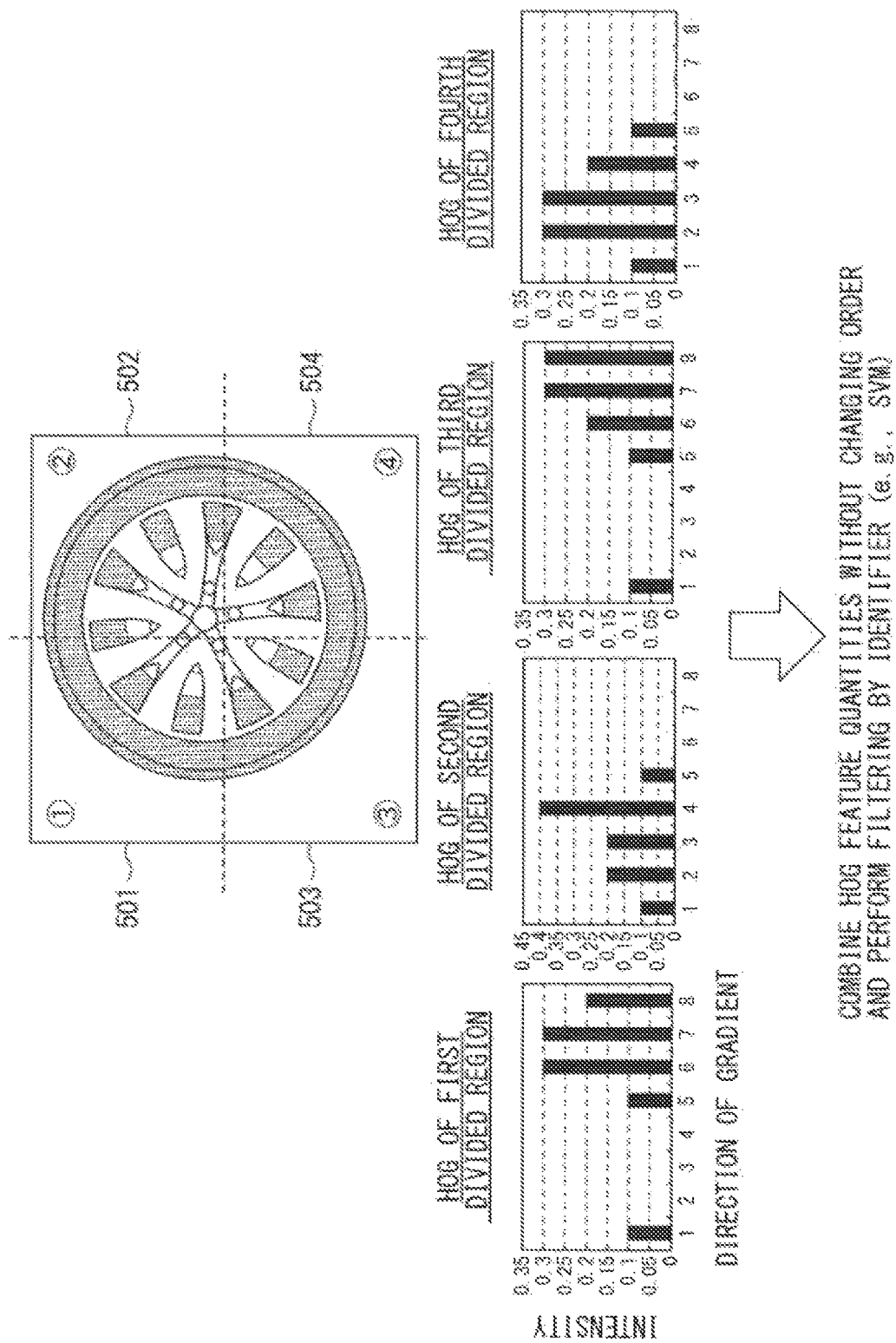
FIG. 21 is an explanatory diagram schematically illustrating an example of a feature quantity calculation process to be performed by a feature quantity calculator in a case where the region of interest is not inclined.
Figure 22:
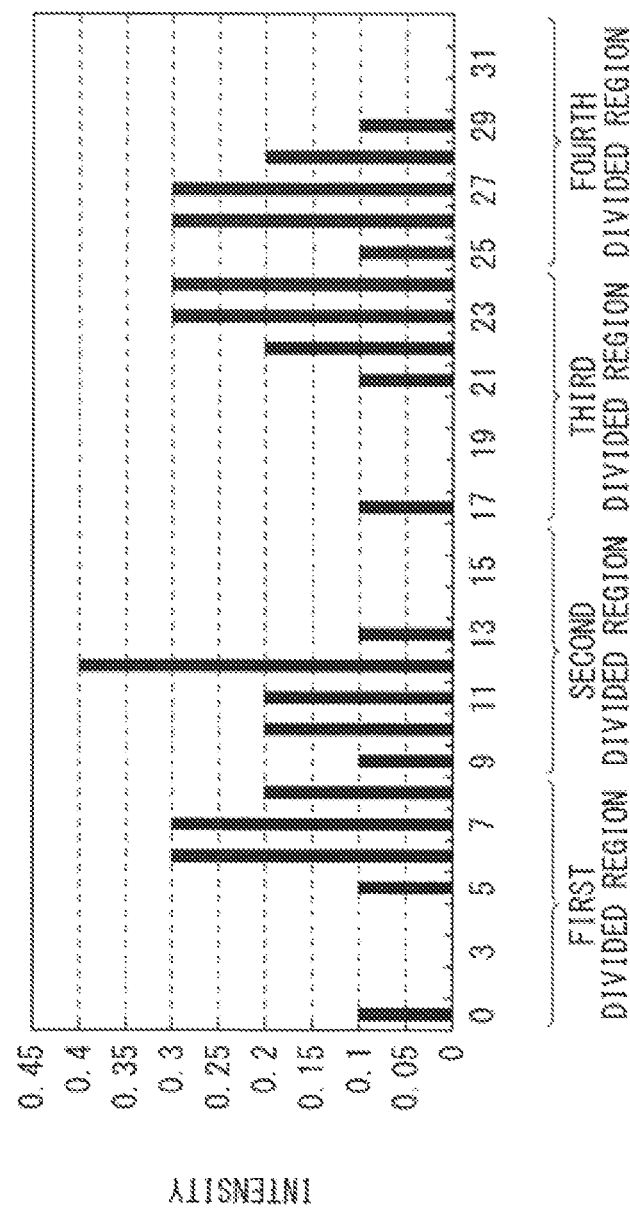
FIG. 22 is an explanatory diagram schematically illustrating an example of a composite feature quantity calculated by the feature quantity calculator in a case where the region of interest is not inclined.

FIG. 21 schematically illustrates an example of a feature quantity calculation process to be performed by the feature quantity calculator 168 in a case where the region of interest is not inclined, i.e., where the inclination angle is 0 (zero) degree. FIG. 22 schematically illustrates an example of the composite feature quantity calculated by the feature quantity calculator 168 in a case where the region of interest is not inclined.

The feature quantity calculator 168 divides the region of interest in the luminance image into the plurality of divided regions. For example, the feature quantity calculator 168 may divide the region of interest into a first divided region 501, a second divided region 502, a third divided region 503, and a fourth divided region 504 as illustrated in FIG. 21. Note that the number of divided regions to be provided by the feature quantity calculator 168 is not limited to four.

Thereafter, the feature quantity calculator 168 calculates the feature quantity of each of the divided regions. For example, the feature quantity calculator 168 may calculate the feature quantity based on the HOG. FIG. 21 illustrates an example in which the HOG feature quantity based on eight dimensional gradient vectors is calculated for each of the divided regions. Note that the number of dimensions to be calculated by the feature quantity calculator 168 is not limited to eight dimensions.

Thereafter, the feature quantity calculator 168 may combine or join the feature quantities of the first divided region 501, the second divided region 502, the third divided region 503, and the fourth divided region 504 in this order as it is as illustrated in FIG. 22 to calculate the composite feature quantity of the region of interest as a whole. Thus, for example, the thirty-two dimensional HOG feature quantity is obtained as a whole.

The feature quantity identifier 169 performs the filtering of the region of interest, on the basis of the composite feature quantity calculated by the feature quantity calculator 168. For example, the feature quantity identifier 169 may perform the filtering based on the SVM.

[Plus Inclination Direction]

Figure 23:
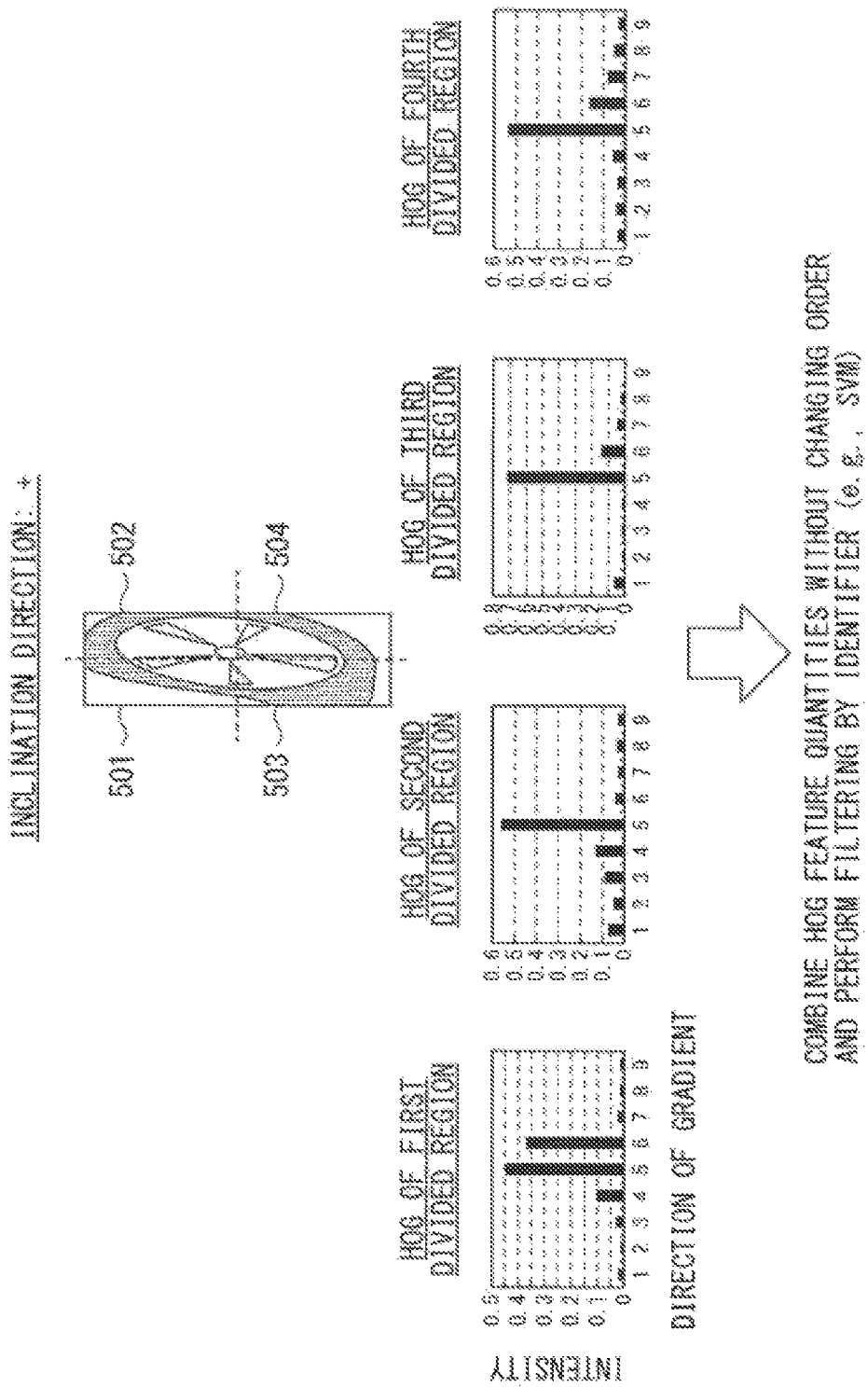
FIG. 23 is an explanatory diagram schematically illustrating an example of the feature quantity calculation process to be performed by the feature quantity calculator in a case where the inclination direction of the region of interest is a plus direction.

FIG. 23 schematically illustrates an example of the feature quantity calculation process to be performed by the feature quantity calculator 168 in a case where the inclination direction of the region of interest is a plus direction.

In a case where the inclination direction is the plus direction, the feature quantity calculator 168 may calculate, for example, the feature quantity of each of the first divided region 501, the second divided region 502, the third divided region 503, and the fourth divided region 504 as illustrated in FIG. 23, on the basis of a procedure similar to the procedure of the above-described example where the inclination angle is zero degree. FIG. 23 illustrates an example in which the HOG feature quantity based on nine dimensional gradient vectors is calculated for each of the divided regions. Note that the number of dimensions to be calculated by the feature quantity calculator 168 is not limited to nine dimensions.

Further, in a case where the inclination direction is the plus direction, the feature quantity calculator 168 may combine or join the feature quantities of the first divided region 501, the second divided region 502, the third divided region 503, and the fourth divided region 504 in this order as it is as illustrated in FIG. 23 to calculate the composite feature quantity of the region of interest as a whole, on the basis of a procedure similar to the procedure of the above-described example where the inclination angle is zero degree. Thus, for example, the thirty-six dimensional HOG feature quantity is obtained as a whole.

The feature quantity identifier 169 performs the filtering of the region of interest, on the basis of the composite feature quantity calculated by the feature quantity calculator 168. For example, the feature quantity identifier 169 may perform the filtering based on the SVM.

[Minus Inclination Direction]

Figure 24:
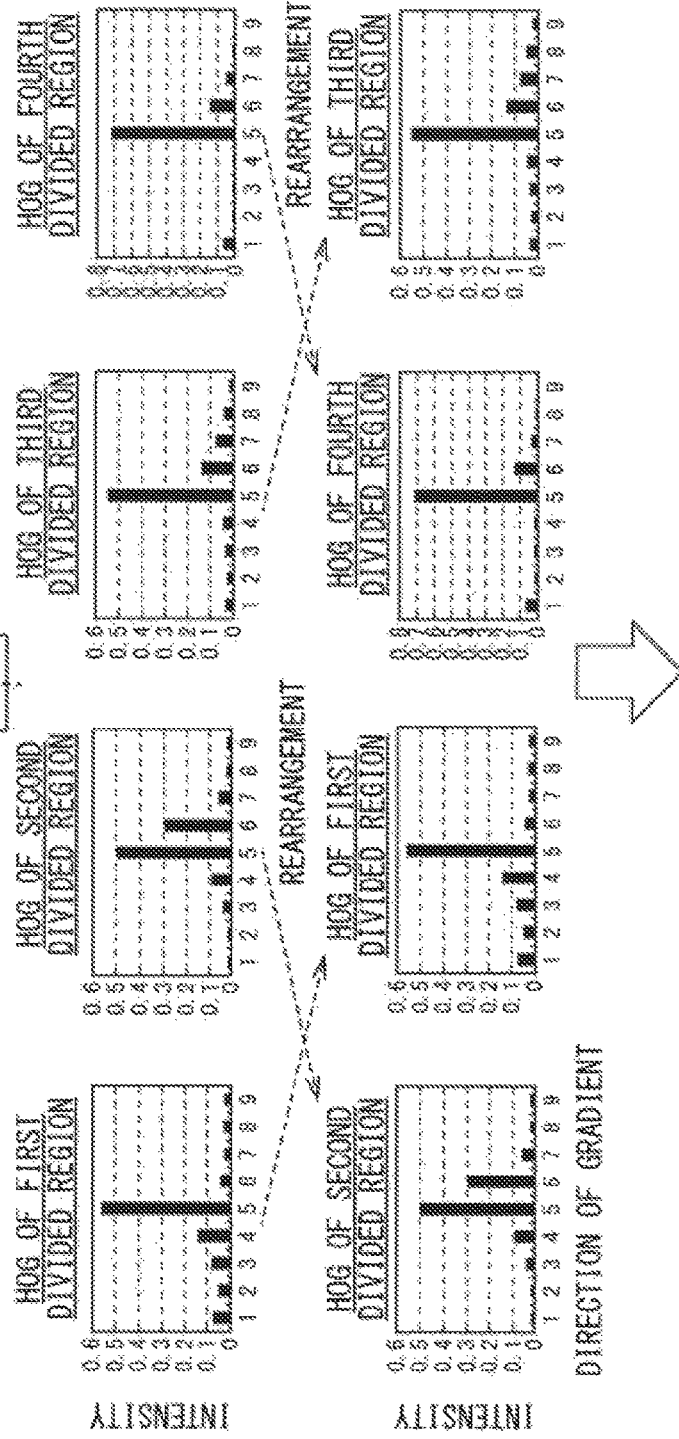
FIG. 24 is an explanatory diagram schematically illustrating an example of the feature quantity calculation process to be performed by the feature quantity calculator in a case where the inclination direction of the region of interest is a minus direction.

FIG. 24 schematically illustrates an example of the feature quantity calculation process to be performed by the feature quantity calculator 168 in a case where the inclination direction of the region of interest is a minus direction.

In a case where the inclination direction is the minus direction, the feature quantity calculator 168 may calculate, for example, the feature quantity of each of the first divided region 501, the second divided region 502, the third divided region 503, and the fourth divided region 504 as illustrated in FIG. 24, on the basis of a procedure similar to the procedure of the above-described example where the inclination angle is zero degree. FIG. 24 illustrates an example in which the HOG feature quantity based on nine dimensional gradient vectors is calculated for each of the divided regions. Note that the number of dimensions to be calculated by the feature quantity calculator 168 is not limited to nine dimensions.

Further, in a case where the inclination direction is the minus direction, the feature quantity calculator 168 may rearrange the order of the first divided region 501, the second divided region 502, the third divided region 503, and the fourth divided region 504 as illustrated in FIG. 24. The feature quantity calculator 168 may thereafter combine or join the feature quantities of the first divided region 501, the second divided region 502, the third divided region 503, and the fourth divided region 504 in the rearranged order as illustrated in FIG. 24 to calculate the composite feature quantity of the region of interest as a whole. Thus, for example, the thirty-six dimensional HOG feature quantity is obtained as a whole.

The feature quantity identifier 169 performs the filtering of the region of interest, on the basis of the composite feature quantity calculated by the feature quantity calculator 168. For example, the feature quantity identifier 169 may perform the filtering based on the SVM.

As described above, the feature quantity calculator 168 may rearrange the order of the feature quantities of the respective divided regions depending on the inclination direction to calculate the composite feature quantity of the region of interest as a whole, making it possible to perform the same filtering based on the SVM irrespective of whether the inclination direction is the plus direction or the minus direction. Thus, it is possible to improve filtering performance.

[1.3 Example Effects]

The vehicle detection apparatus according to the first example embodiment optimizes the processes related to the wheel detection of the vehicle that are based on the region of interest in the image, as described above. Hence, it is possible to detect a wheel of a vehicle efficiently and efficiently detect the vehicle accordingly.

The vehicle detection apparatus according to the first example embodiment also makes it possible to efficiently detect not only the wheel that directly faces the own vehicle 1 but also the wheel appeared on a side of the own vehicle 1.

2. Other Example Embodiments

Although some example embodiments of the technology have been described in the foregoing, the technology is by no means limited to the example embodiments described above. Various changes and modifications may be made to any embodiment without departing from the scope of the technology.

At least one embodiment also provides a program that causes a computer to function as the vehicle exterior environment recognition apparatus 120, and a computer-readable recording medium that stores the program. Non-limiting examples of the recording medium may include a flexible disk, a magneto-optical disk, ROM, CD, DVD (Registered Trademark), and BD (Registered Trademark). As used herein, the term "program" may refer to a data processor written in any language and any description method.

A part or all of the processes performed by the vehicle detector 160 in an example embodiment described above does not necessarily have to be processed on a time-series basis in the order described in the example flowchart illustrated in FIG. 3. A part or all of the processes performed by the vehicle detector 160 may involve parallel processing or processing based on subroutine.

The central controller 154 or the vehicle detector 160 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 154 or the vehicle detector 160. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 154 or the vehicle detector 160 illustrated in FIG. 2.

The invention claimed is:

1. A vehicle detection apparatus comprising:
circuitry configured to:
cut out a region of interest in an image;
calculate an inclination angle of the region of interest with respect to a horizontal direction of the image;
divide the region of interest into a plurality of divided regions;
calculate a feature quantity of each of the divided regions;
combine the calculated feature quantities of the respective divided regions together, wherein the calculated feature quantities are combined according to a first order when the inclination angle falls within a first angle range, wherein the calculated feature quantities are combined according to a second order when the inclination angle falls within a second angle range, wherein the first angle range and the second angle range do not overlap one another, wherein the first order is different from the second order;
calculate a composite feature quantity of the region of interest according to the combined feature quantities of the respective divided regions; and perform, on a basis of the calculated composite feature quantity, filtering that discards the region of interest that is determinable as not being a wheel of a vehicle.

2. The vehicle detection apparatus according to claim 1, wherein the circuitry is further configured to acquire representative distances of respective outer regions positioned on a left side and a right side of the region of interest, and perform, on a basis of the acquired representative distances of the respective outer regions, filtering that discards the region of interest that is determinable as not being the wheel of the vehicle.

3. The vehicle detection apparatus according to claim 1, wherein the circuitry is further configured to adjust the region of interest to be in form of a rectangular region.

4. The vehicle detection apparatus according to claim 1, wherein the circuitry is further configured to perform, on a basis of color information in the region of interest, filtering that discards the region of interest that is determinable as not being the wheel of the vehicle.

5. The vehicle detection apparatus according to claim 1, wherein the region of interest includes a target object, wherein the image is captured by a camera, and wherein calculating the inclination angle of the region of interest with respect to the horizontal direction of the image includes:
calculating, in a three-dimensional space, a rate of change in distance from the camera to the target object in the region of interest along the horizontal direction of the image.

* * * * *